(12) United States Patent
Bhat et al.

(10) Patent No.: US 12,067,137 B2
(45) Date of Patent: Aug. 20, 2024

(54) SYSTEM AND METHOD OF PROCESSING A DATA ACCESS REQUEST

(71) Applicant: The Toronto-Dominion Bank, Toronto (CA)

(72) Inventors: Shishir Dattatraya Bhat, Toronto (CA); Marcus Edward Furlong, Sandy Springs, GA (US); Katherine Kanczuga, Toronto (CA); Sumathi Seetharaman, Etobicoke (CA)

(73) Assignee: The Toronto-Dominion Bank, Toronto (CA)

( * ) Notice: Subject to any disclaimer, the term of this patent is extended or adjusted under 35 U.S.C. 154(b) by 308 days.

(21) Appl. No.: 17/490,743

(22) Filed: Sep. 30, 2021

(65) Prior Publication Data

US 2023/0096672 A1    Mar. 30, 2023

(51) Int. Cl.
G06F 21/62        (2013.01)
G06Q 40/02        (2023.01)

(52) U.S. Cl.
CPC ......... *G06F 21/6218* (2013.01); *G06Q 40/02* (2013.01)

(58) Field of Classification Search
CPC .. G06F 21/6245; G06F 21/6218; G06Q 40/02
See application file for complete search history.

(56) References Cited

U.S. PATENT DOCUMENTS

| | | | |
|---|---|---|---|
| 8,145,554 B2 | 3/2012 | Kumar et al. | |
| 9,213,966 B2 | 12/2015 | Jin et al. | |
| 10,346,902 B2 | 7/2019 | Pant et al. | |
| 10,692,138 B1 * | 6/2020 | Nguyen | H04L 63/08 |
| 10,904,239 B2 | 1/2021 | Hockey et al. | |
| 10,911,439 B2 | 2/2021 | Caldwell | |
| 2019/0318122 A1 | 10/2019 | Hockey et al. | |
| 2020/0074565 A1 | 3/2020 | Dotter | |

(Continued)

FOREIGN PATENT DOCUMENTS

CA          3045264 A1      12/2020

OTHER PUBLICATIONS

Green., "JPmorgan Chase Is Working on Tools to Let Customers Control Which Third-party Apps Can Access Their Data," Business Insider, Jan. 2020, 4 pages.

*Primary Examiner* — Tri M Tran
(74) *Attorney, Agent, or Firm* — BORDEN LADNER GERVAIS; Curtis Behmann

(57) ABSTRACT

Computing platforms, methods, and storage media for processing a data access request are disclosed. Exemplary implementations may: receive, at an apparatus, a data access request from a communication device and via a network; and generate, at the apparatus and based on the received data access request, a revocable 1:1:1 token that authorizes data sharing for a specific combination of third party application-aggregator-institution. Exemplary implementations may transmit the revocable 1:1:1 token for storage in a token database, and may store the 1:1:1 tokens in a token database associated with an institution related to the data access request; this allows access to be managed by the user and controlled by the institution, without relying on the aggregator. Exemplary implementations may provide a dashboard enabling a user to individually remove apps from data sharing, based on management of the 1:1:1 tokens.

17 Claims, 6 Drawing Sheets

(56) References Cited

U.S. PATENT DOCUMENTS

| | | |
|---|---|---|
| 2020/0311298 A1 | 10/2020 | Dunjic et al. |
| 2020/0314194 A1 | 10/2020 | Thomas et al. |
| 2021/0027291 A1 | 1/2021 | Ranganathan et al. |
| 2021/0081947 A1* | 3/2021 | Hockey .................. G06F 21/45 |
| 2023/0128813 A1* | 4/2023 | Babani ................ G06F 21/6245 |
| | | 726/4 |

* cited by examiner

SYSTEM AND METHOD OF PROCESSING A DATA ACCESS REQUEST

FIELD

The present disclosure relates to sharing user data, including but not limited to computing platforms, methods, and storage media for processing a data access request.

BACKGROUND

Sharing user data is useful in a number of different scenarios. Open banking is a mechanism that enables the sharing of user or customer financial data securely, and at the customer's request, between financial service providers. Often, open banking includes sharing financial data between a financial institution and a third party application.

For open banking and sharing banking credentials with fintech applications, a data aggregator, or aggregator, is frequently used, for example using a tool or platform such as Plaid. A financial institution (FI) communicates with the aggregator to manage access to customer financial institution data for a number of different fintech apps.

In known approaches, the aggregator manages the data access, and tokens are typically issued per financial institution-aggregator pair.

Improvements in approaches of processing a data access request are desirable.

SUMMARY

One aspect of the present disclosure relates to a computing platform configured for processing a data access request. The computing platform may include one or more hardware processors configured by machine-readable instructions stored on a non-transient computer-readable storage medium. The processor(s) may be configured to receive, at the computing platform, a data access request from a communication device and via a network. The data access request may relate to a third party application and to a user associated with the communication device. The processor(s) may be configured to generate, at the computing platform and based on the received data access request, a revocable 1:1:1 token. The revocable 1:1:1 token may authorize data sharing for a specific combination of third party application-aggregator-institution for the user associated with the communication device.

Another aspect of the present disclosure relates to a method of processing a data access request. The method may include receiving, at an apparatus, a data access request from a communication device and via a network. The data access request may relate to a third party application and to a user associated with the communication device. The data access request may relate to a third party application. The method may include generating, at the apparatus and based on the received data access request, a revocable 1:1:1 token. The revocable 1:1:1 token may authorize data sharing for a specific combination of third party application-aggregator-institution for the user associated with the communication device.

Still another aspect of the present disclosure relates to a non-transient computer-readable storage medium having instructions embodied thereon, the instructions being executable by one or more processors to perform a computer-implemented method of processing a data access request. The method may include receiving, at an apparatus, a data access request from a communication device and via a network. The data access request may relate to a third party application and to a user associated with the communication device. The method may include generating, at the apparatus and based on the received data access request, a revocable 1:1:1 token. The revocable 1:1:1 token may authorize data sharing for a specific combination of third party application-aggregator-institution for the user associated with the communication device.

BRIEF DESCRIPTION OF THE DRAWINGS

Embodiments of the present disclosure will now be described, by way of example only, with reference to the attached Figures.

DETAILED DESCRIPTION

Figure 1:
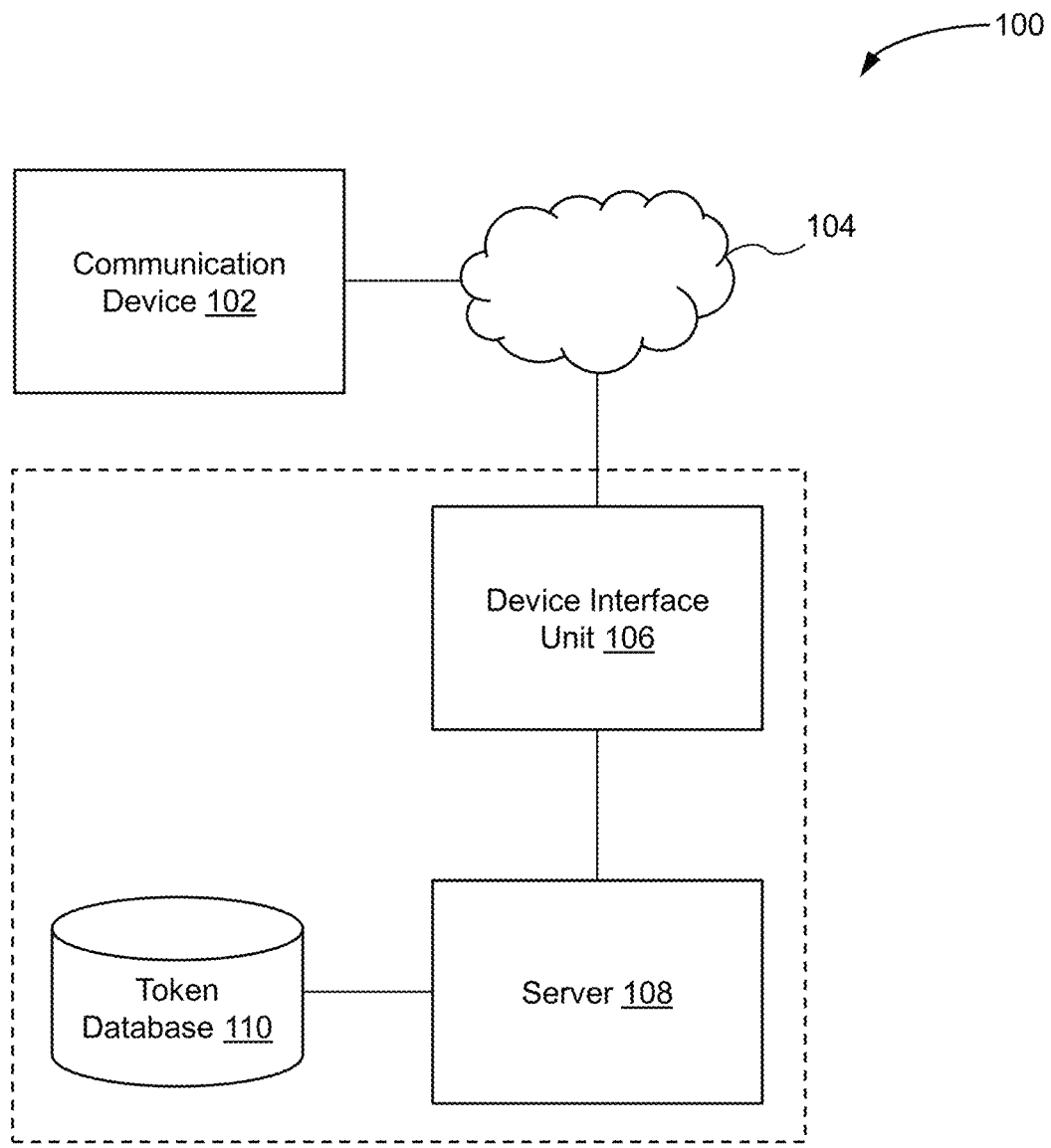
FIG. 1 illustrates a system configured for processing a data access request in accordance with one or more embodiments.

Computing platforms, methods, and storage media for processing a data access request are disclosed. Exemplary implementations may: receive, at an apparatus, a data access request from a communication device and via a network; and generate, at the apparatus and based on the received data access request, a revocable 1:1:1 token that authorizes data sharing for a specific combination of third party application-aggregator-institution. Exemplary implementations may transmit the revocable 1:1:1 token for storage in a token database, and may store the 1:1:1 tokens in a token database associated with an institution related to the data access request; this allows access to be managed by the user and controlled by the institution, without relying on the aggregator. Exemplary implementations may provide a dashboard enabling a user to individually remove apps from data sharing, based on management of the 1:1:1 tokens.

The present disclosure provides a system and method configured to provide automated registration and instant revocation for individual third party applications, such as fintech apps. In an embodiment, the system or method issues a 1:1:1 authorization token for a specific combination of application-aggregator-institution. A user, for example a financial institution customer, may revoke the 1:1:1 token. Example embodiments of the present disclosure bring data sharing access under the control of the institution, and removes reliance on the aggregator to properly manage data sharing access. In an example embodiment, a dashboard is provided, which enables a user to individually remove apps from data sharing, powered on the backend by the 1:1:1 token.

By controlling data access according to embodiments of the present disclosure, a financial institution can measure and track which apps are connected to their system, and can revoke tokens to limit data flow, for example in the case of a security incident. In previous approaches, a financial institution would grant an aggregator access to all data for all third party fintech apps, and the FI would typically be unaware of which registered app(s) is/are accessing the data.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and, further modifications, and any, further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent, further, the present processes are not limited by the usage of the terms shown below, as all equivalents, synonyms, new developments and terms or processes that serve the same or a similar purpose are considered to be within the scope of the present disclosure.

FIG. 1 illustrates a system 100 configured for processing a data access request, in accordance with one or more embodiments. The system 100 includes a communication device 102 in communication with a network 104, where the communication device is associated with a user of the system or a customer of the system. A device interface unit 106, or customer interface unit, is in communication with the network 104. A server 108 is in communication with the device interface unit 106 and with a token database 110. In an embodiment, the device interface unit 106, the server 108 and the token database 110 are associated with an institution, such as a financial institution. In an embodiment, the device interface unit 106, the server 108 and the token database 110 are managed by, or under the control of, an institution, such as a financial institution.

The device interface unit 106 is configured to receive a data access request from the communication device 102 and via the network 104. The data access request relates to a third party application and to a user associated with the communication device. The device interface unit 106 is also configured to generate, based on the received data access request, a revocable 1:1:1 token. The revocable 1:1:1 token may be a revocable access token. The revocable 1:1:1 token authorizes data sharing for a specific combination of third party application-aggregator-institution for the user associated with the communication device. The revocable 1:1:1 token may be transmitted to the server 108 and stored in the token database 110. The revocable 1:1:1 token may be transmitted along with a user identifier associated with the user, for storage in a token database, in order to associate the revocable 1:1:1 token with a user-specific data access request. The device interface unit 106 may initiate storage of the 1:1:1 token in a token database associated with the institution specified in the 1:1:1 token.

In an embodiment, the token database 110 stores a plurality of revocable 1:1:1 tokens. In an example embodiment, each of the plurality of revocable 1:1:1 tokens is stored along with an associated user identifier, for example to associate a specific user with the identified combination of third party application-aggregator-institution. In so doing, the token database 110 stores a plurality of user-specific access permissions for particular combinations of third party application-aggregator-institution. In an embodiment, the server 108 manages third party application connectivity of a plurality of third party applications based on tracking associated revocable 1:1:1 tokens in the plurality of access tokens. In an embodiment, the device interface unit 106 manages, in conjunction with the server 108, third party application connectivity of a plurality of third party applications based on tracking associated revocable 1:1:1 tokens in a plurality of access tokens.

In an embodiment, the device interface unit 106 is configured to generate, in conjunction with the server 108, the revocable 1:1:1 token independent of the aggregator. In an embodiment, the server 108 is configured to generate the revocable 1:1:1 token independent of the aggregator. In an example embodiment, the server 108 is an institution server associated with the institution identified in the 1:1:1 token. In an example embodiment, the access request comprises an open banking access request associated with the user, the third party application comprises a third party financial application, and the institution comprises a financial institution storing data associated with the user.

Advantageously, generating and using a revocable 1:1:1 token according to embodiments of the present disclosure authorizes granular access that is limited to the specified combination of third party application and aggregator and institution. The use of a token advantageously avoids the need to transmit or store usernames and passwords. The use of a 1:1:1 token enables a user to view and control at a granular level the types of access being granted via a data aggregator to one or more third party applications. The storage of the 1:1:1 tokens in a token database associated with an institution allows access to be managed by the user and controlled by the institution, without relying on the aggregator.

In an embodiment, to be described in more detail later in relation to FIG. 5, the device interface unit 106 is configured to provide, in conjunction with the server 108, a dashboard that enables a user, or customer, to individually remove the third party application from data sharing based on the generated 1:1:1 token. In an embodiment, the dashboard is provided by the server 108 for display at the communication device 102.

For example, suppose a user grants access according to an embodiment of the present disclosure to App1 via Aggregator1, and also grants access to App2 via Aggregator1, both for one or more user accounts at Institution1. Embodiments of the present disclosure generate and store a first revocable 1:1:1 token that authorizes access to App 1, via Aggregator1 to user information at Institution 1. Embodiments of the present disclosure generate and store a second revocable 1:1:1 token that authorizes access to App 2, via Aggregator1 to user information at Institution 1. In an example embodiment, the institution makes available to the user a dashboard or other user interface to view and manage the access already granted, and to remove any one type of access by revoking the associated revocable 1:1:1 token.

In an embodiment, the revocable 1:1:1 token is received from a communication device associated with a user, and relates to data associated with the user. For example, when the revocable 1:1:1 token relates to sharing data associated with a financial institution, the revocable 1:1:1 token may relate to sharing data associated with the user's account(s) at the financial institution.

In an embodiment, the revocable 1:1:1 token conforms to existing institution design parameters, with respect to storage or formatting, or both. For example, the revocable 1:1:1 token may encapsulate information such as one or more of the following: an aggregator identifier; a third party application identifier; access duration granted; a unique user identification, or customer identification, that may be persistent and independent of a username and password.

Embodiments of the present disclosure provide automated app registration. Typically, a manual process is used in which the user does not take additional steps, but the aggregator manually arranges for registration of the app with the financial institution, on the app's behalf. Embodiments of the present disclosure enable the app to be registered directly with the financial institution, without going through the aggregator to do the registration. In one implementation, the first time a user connects a specific fintech app to an FI, the app is automatically approved for all users. In another implementation, when a user onboards according to an embodiment of the present disclosure, the fintech app is automatically registered in the system, and data flow is real-time.

Figure 2:
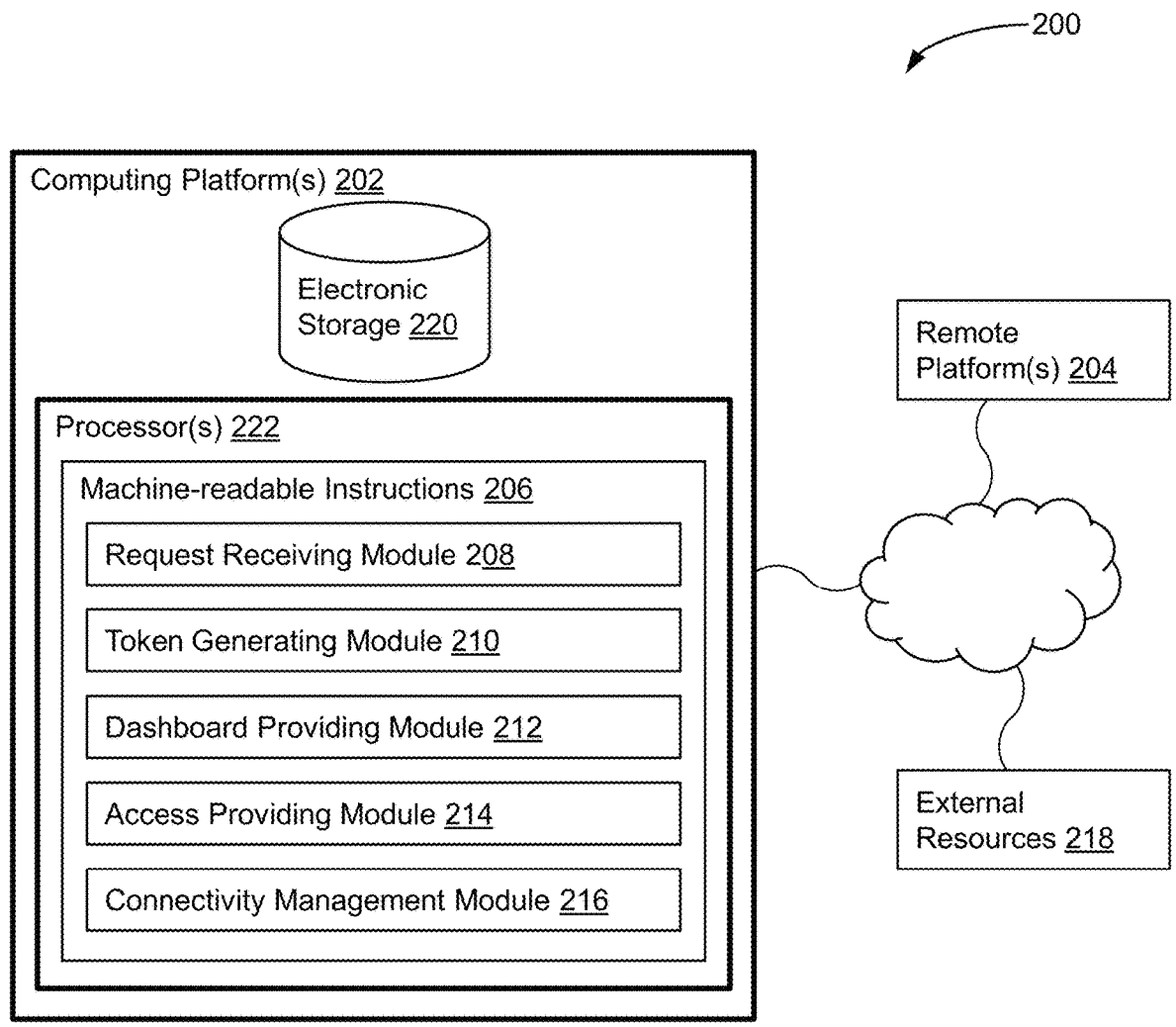
FIG. 2 illustrates another system configured for processing a data access request in accordance with one or more embodiments.

FIG. 2 illustrates another system 200 configured for processing a data access request, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of request receiving module 208, token generating module 210, dashboard providing module 212, access providing module 214, access enabling module 216, connectivity management module 216, and/or other instruction modules.

Request receiving module 208 may be configured to receive a data access request from a communication device and via a network. The operation may be performed at an apparatus that is part of or associated with the computing platform. The data access request may relate to a third party application and to a user associated with the communication device. The access request may include an open banking access request. The third party application may include a third party financial application.

Token generating module 210 may be configured to generate, based on the received data access request, a revocable 1:1:1 token. The revocable 1:1:1 token may authorize data sharing for a specific combination of third party application-aggregator-institution for the user associated with the communication device.

Token generating module 210 may be configured to generate, in conjunction with a server, the revocable 1:1:1 token independent of the aggregator.

Token generating module 210 may be configured to transmit the revocable 1:1:1 token for storage in a token database. Token generating module 210 may be configured to transmit the revocable 1:1:1 token and a user identifier associated with the user, for storage in a token database to associate the revocable 1:1:1 token with a user-specific data access request. Token generating module 210 may be configured to initiate storage of the 1:1:1 token in a token database associated with the institution specified in the 1:1:1 token.

Dashboard providing module 212 may be configured to provide, in conjunction with a server, a dashboard that enables a customer to individually remove the third party application from data sharing based on the generated 1:1:1 token.

Access providing module 214 may be configured to provide, in conjunction with a server, data sharing access to the third party application based on the generated 1:1:1 token.

Connectivity management module 216 may be configured to manage, via the server, third party application connectivity of a plurality of third party applications based on tracking associated revocable 1:1:1 tokens in the plurality of access tokens.

In some embodiments, computing platform(s) 202, remote platform(s) 204, and/or external resources 218 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 218 may be operatively linked via some other communication media.

A given remote platform 204 may include one or more processors configured to execute computer program modules. The computer program modules may be configured to enable an expert or user associated with the given remote platform 204 to interface with system 200 and/or external resources 218, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 218 may include sources of information outside of system 200, external entities participating with system 200, and/or other resources. In some embodiments, some or all of the functionality attributed herein to external resources 218 may be provided by resources included in system 200.

Computing platform(s) 202 may include electronic storage 220, one or more processors 222, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 220 may comprise non-transitory storage media that electronically stores information. The electronic storage media of electronic storage 220 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 220 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 220 may include one or more virtual storage resources (e.g., cloud storage, a virtual private network, and/or other virtual storage resources). Electronic storage 220 may store software algorithms, information determined by processor(s) 222, information received from computing platform(s) 202, information received from remote platform(s) 204, and/or other information that enables computing platform(s) 202 to function as described herein.

Processor(s) 222 may be configured to provide information processing capabilities in computing platform(s) 202. As such, processor(s) 222 may include one or more of a digital processor, an analog processor, a digital circuit designed to process information, an analog circuit designed to process information, a state machine, and/or other mechanisms for electronically processing information. Although processor(s) 222 is shown in FIG. 2 as a single entity, this is for illustrative purposes only. In some embodiments, processor(s) 222 may include a plurality of processing units. These processing units may be physically located within the same device, or processor(s) 222 may represent processing functionality of a plurality of devices operating in coordination. Processor(s) 222 may be configured to execute modules 208, 210, 212, 214 and/or 216, and/or other modules. Processor(s) 222 may be configured to execute modules 208, 210, 212, 214 and/or 216, and/or other modules by software; hardware; firmware; some combination of software, hardware, and/or firmware; and/or other mechanisms for configuring processing capabilities on processor(s) 222. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214 and/or 216 are illustrated in FIG. 2 as being implemented within a single processing unit, in embodiments in which processor(s) 222 includes multiple processing units, one or more of modules 208, 210, 212, 214 and/or 216 may be implemented remotely from the other modules. The description of the functionality provided by the different modules 208, 210, 212, 214 and/or 216 described below is for illustrative purposes, and is not intended to be limiting, as any of modules 208, 210, 212, 214 and/or 216 may provide more or less functionality than is described. For example, one or more of modules 208, 210, 212, 214 and/or 216 may be eliminated, and some or all of its functionality may be provided by other ones of modules 208, 210, 212, 214 and/or 216. As another example, processor(s) 222 may be configured to execute one or more additional modules that may perform some or all of the functionality attributed below to one of modules 208, 210, 212, 214 and/or 216.

Figure 3:
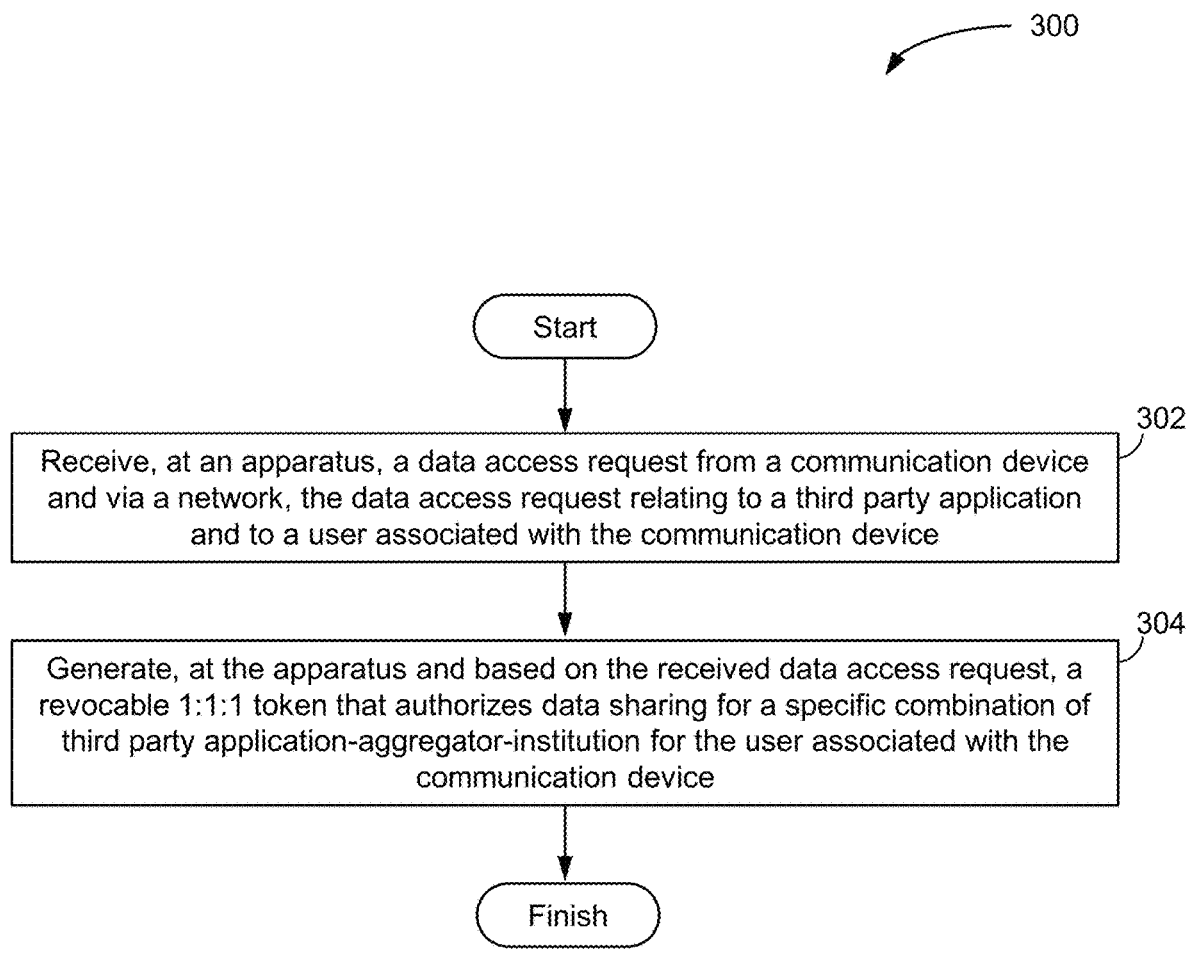
FIG. 3 illustrates a method for processing a data access request in accordance with one or more embodiments.

FIG. 3 illustrates a method 300 for processing a data access request, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include receiving, at the computing platform, a data access request from a communication device and via a network. The data access request may relate to a third party application. Operation 302 may be performed by one or more hardware processors configured by machine-readable instructions including a module that is the same as or similar to request receiving module 208, in accordance with one or more embodiments.

An operation 304 may include generating, at the computing platform and based on the received data access request, a revocable 1:1:1 token that authorizes data sharing for a specific combination of third party application-aggregator-institution. Operation 304 may be performed by one or more hardware processors configured by machine-readable instructions including a module that is the same as or similar to token generating module 210, in accordance with one or more embodiments.

In relation to FIG. 3, in an embodiment the operations 302 and/or 304 may be performed at an apparatus such as the device interface unit 106 of FIG. 1. In another embodiment, the operations 302 and/or 304 may be initiated or controlled by another apparatus, such as the server 108 of FIG. 1, but may include an apparatus such as the device interface unit 106 of FIG. 1.

Figure 4:
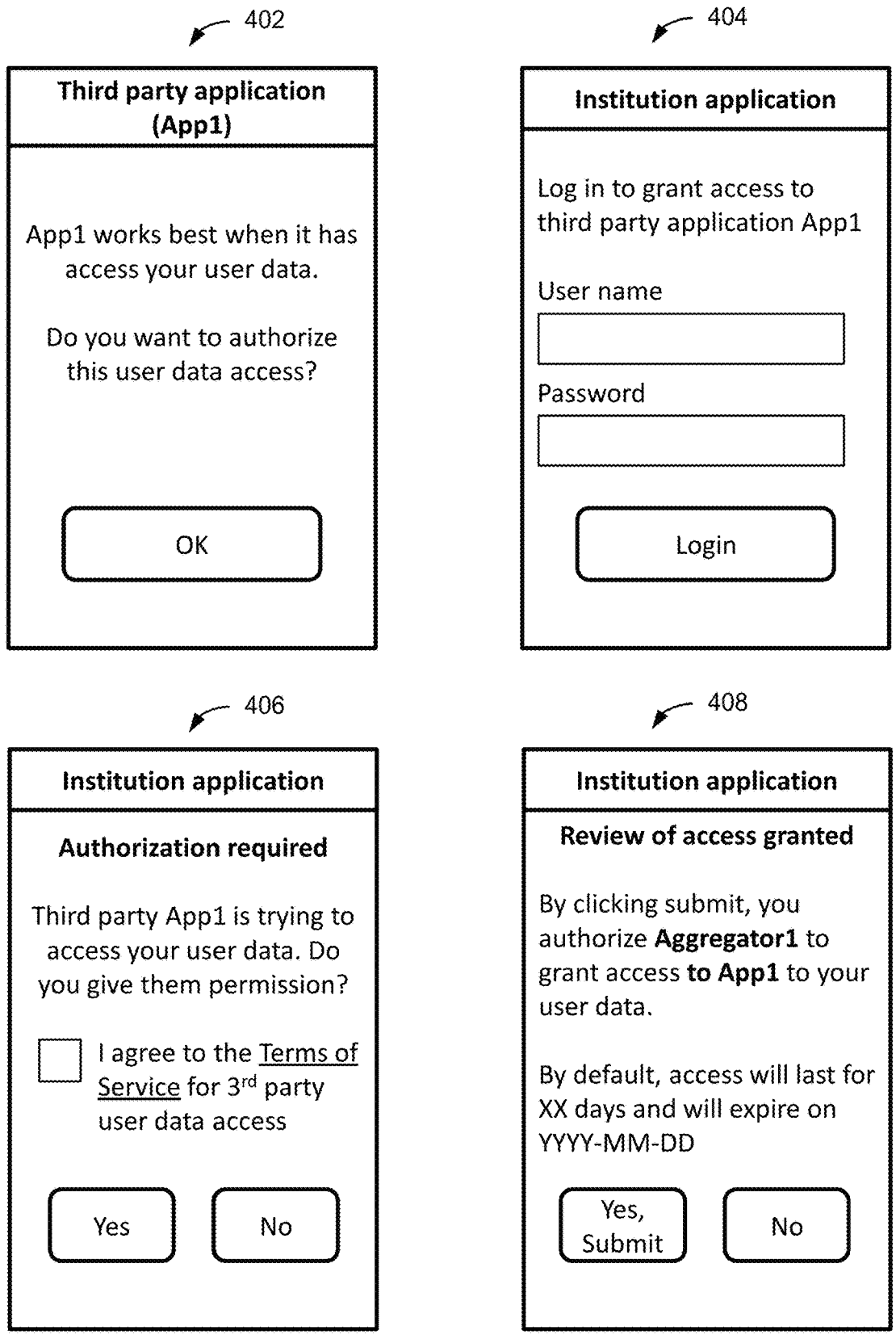
FIG. 4 illustrates a set of example user interface screenshots relating to a method for processing a data access request in accordance with one or more embodiments.

FIG. 4 illustrates a set of example user interface screenshots relating to a method for processing a data access request in accordance with one or more embodiments. At 402, a first user interface is shown as part of a third party application, designated here as App1. The user interface at 402 provides an indication that App1 works best when it has access to the user's data. In an example embodiment, 402 may provide a detailed indication of specific data to which the app is requesting access and/or an assurance of the security and privacy of the data transfer. The user interface 402 may identify both App1 and Aggregator1 as a data aggregator through which the data transfer will be accomplished.

In an example embodiment, when the user selects "OK" from user interface 402, the user is redirected to a user interface 404 associated with the institution that will be granting access to the user data. The user interface 404 may be a website or a mobile app associated with or hosted by the institution, for example a financial institution, and not hosted by or associated with the third party application or aggregator. In the example user interface 404, the user may be prompted to log in to their account(s) at the institution, in order to grant access to the third party application App1, and may optionally include other contextual information from or associated with user interface 402 or with the related data access request.

After a user has logged in via user interface 404, the user may be directed to user interface 406 in which the user is provided with a prompt of whether to explicitly grant App1 access to their user information. As shown in user interface 406, an embedded prompt or selection box may be included for the user to explicitly agree to the specific terms of service for third party access (for which a hyperlink may be provided), which may be general terms of service for all third parties, or may be specific to App1. Alternatively, agreeing to the authorization in user interface 406 may bring the user to a separate user interface (not shown) in which the applicable terms of service are displayed, and the user must agree to the terms after having scrolled down to read through.

At user interface 408, a data access review or data access confirmation is provided, for example in response to the user granting access permission via the user interface 406. In the example embodiment in FIG. 4, the user interface 408 includes a specific indication of the aggregator (Aggregator1) and the third party application (App1), and implicitly specifies the institution since the user is logged in to an account at the institution. The user interface 408 may also include an indication of the default access that is provided, for example indicating the number of days access is granted and the expiry date for such access. In response to a confirmation of the access granted, a revocable 1:1:1 token may be stored in the token database, based on the data gathered in association with the user interfaces 402, 404, 406 and 408. Other data may also be used, for example user identification data, third party application identification data, and aggregator identification data.

In a specific example embodiment, the method steps associated with the user interfaces 402, 404, 406, 408 and/or other intervening or additional aspects, may include the following example steps. Aggregator1 may render Institution1's Authentication Page, passing in one or more of the following parameters: Aggregator1 ClientID; API secret; AppID, which may be an ID Uniquely identifying client; App Name, which may be the name of the application/client utilizing Aggregator1's API; Access Duration Requested, which may be onetime, short, intermediate or long; Redirect URL, which may be the Aggregator1 URL to receive authorization code.

Institution1 may post the authorization result to Aggregator1's redirect URL on success an Authorization Code. Aggregator1 may exchange the temporary Auth Code for a refresh & access token pair. If not one time access, then Aggregator1 may store the refresh token and will use it to obtain access token for future access. Aggregator1 may use the access token for API calls.

Follow-up API access may require passing the refresh token to an Institution1 token API for a new access token along with indicator of if customer is present or offline/batch access. When the refresh token expires, based upon originally requested duration, in an embodiment the authorization process must be carried out again by the user or customer to generate another auth code and subsequent access/refresh token pair. In an example implementation, access and refresh tokens are to be kept on Aggregator1's server side and never revealed to Aggregator1's API clients.

In an example implementation, where Institution1 is a financial institution, Institution1 may confine access to the following APIs: Authorization Code Exchange; Profile Listing API—e.g. (GET/customer/profiles); Profile Switching API—e.g. (PUT /customer/currentprofile); Account listing API—e.g. (GET/customer/accounts); Account details API—e.g. presently available (GET/accounts/{id}); Account Transactions—e.g. (GET/account/{id}/transactions).

Consider an example scenario in which a user or customer chooses to add their bank accounts to a composite view. The aggregator may have the user select their bank from a list of financial institutions (FIs). The Aggregator may customize the FI linking based upon an authorization code grant flow and refresh token grant flow where:

1. Aggregator UI opens a browser, popup to a URL, passing a redirecturl, clientid, application id (representing 4th party applications) and a descriptive application name that will be displayed to users.

2. A domain associated with the FI authenticates the user just like they were logging into a normal internet banking session 3. Once the completed the authentication flow, the user will be asked to grant the 3rd/4th party access to their data, accept terms and conditions and finally confirm the data sharing.

4. The terms and conditions acceptance will be recorded and an Authorization Code with any specified permissions granted will be stored.

5. The user's browser will be redirected to url passing the authorization

6. The aggregator then accesses the FI domain token service exchanging the authorization code for tokens that will enable access the FI internet facing REST resources on-behalf of that customer.

According to certain embodiments, an access token and a refresh token may be used. The access token may used as a bearer token for API access and may be short lived, In an embodiment, the access token matches the token lifespan for the mobile/table and responsive user interface, which may for example be 9 minutes. The refresh token is a long lived token used to obtain access tokens. The refresh token may have access for N days based upon what the aggregators has asked for in the authorization request and what is configured for the client_ID.

In an implementation, a third party protects the refresh tokens only using it from their servers never passing back to clients. Similarly, the access token may be used only from the aggregator services. In an embodiment, the refresh token is stored securely, and the third party store their clientid and the accompanying secret securely. In an embodiment, the secret is stored in an encrypted format as this is the aggregator's password for obtaining tokens.

Refresh tokens may be revokable in 3 ways:

1. A user or customers may withdraw their authorization at any time in a user interface, for example the dashboard.

2. A representative associated with an institution associated with the data transfer may revoke the token from a relationship management context, for example based on a customer request or in response to a fraud team indication that there may be fraud.

3. Technical operations may revoke the token based on a bulk process, for example due to an aggregator getting hacked, or the third party relationship ending.

4. Tokens have an expiration time, after which the authorization is no good and the token may be revoked. The user may then need to re-authorize the external party. A batch job may be configured to delete expired tokens.

Figure 5:
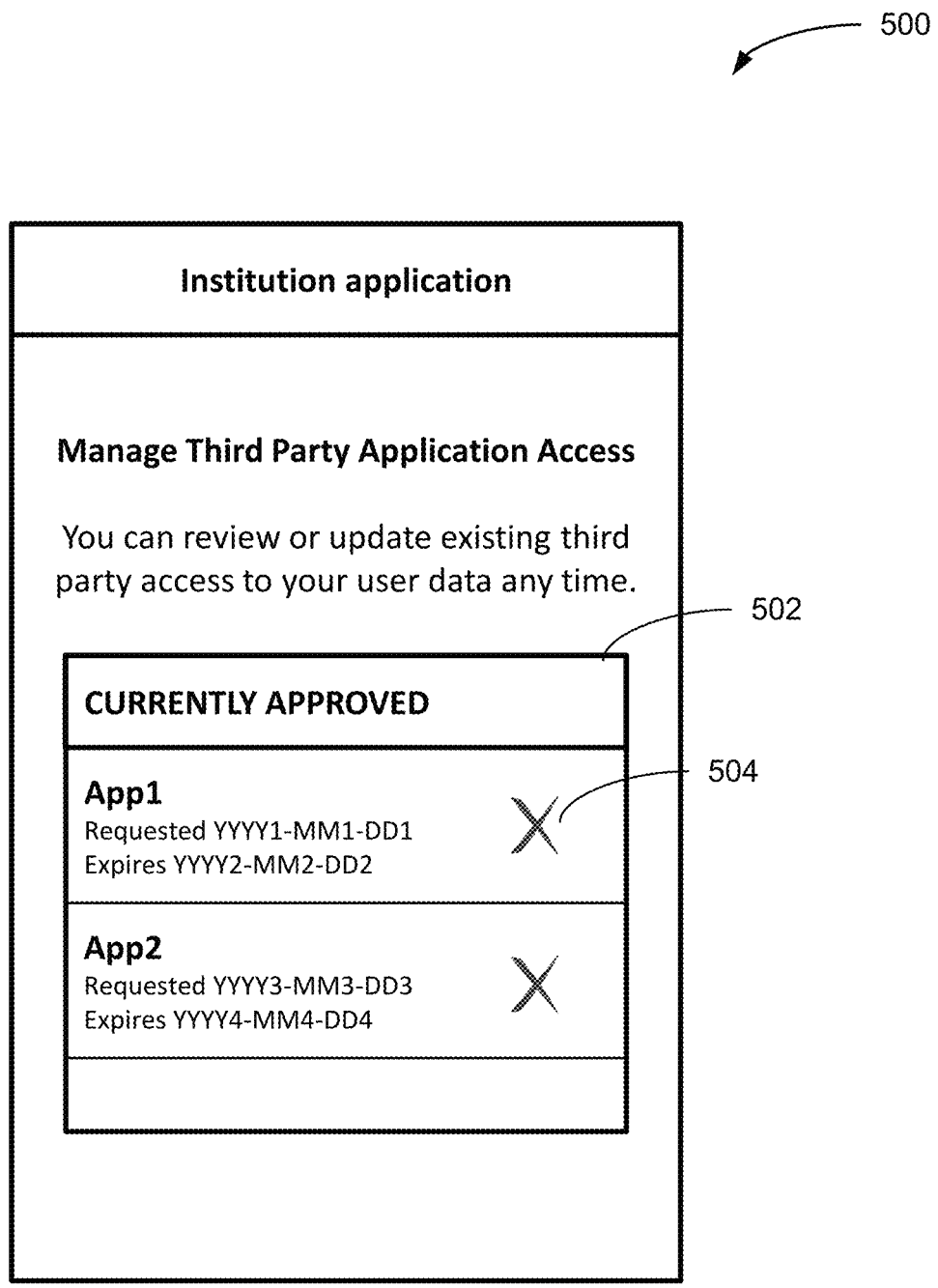
FIG. 5 illustrates another example user interface screenshot relating to a method for processing a data access request in accordance with one or more embodiments.

FIG. 5 illustrates another example user interface screenshot 500 relating to a method for processing a data access request in accordance with one or more embodiments. FIG. 5 illustrates an example user interface 500, for example a customer dashboard. The example embodiment in FIG. 5 enables a user to individually remove apps from data sharing, powered on the backend by the revocable 1:1:1 tokens.

The user interface 500 may indicate at 502 a list of the plurality of third party applications for which data access is currently granted, and for which a revocable 1:1:1 token is stored in the token database. The list 502 of the plurality of third party applications may include the name of the third party application, the date that access was requested, and the date that the current access expires.

The user interface 500 may also include an access revocation selector 504, for example the "X" illustrated in FIG. 5, a trash can, or other visual indicator. In response to user selection of the access revocation selector 504, an instruction may be generated for the server to revoke access, such as by deleting from the token database the 1:1:1 token for the specified third party application-aggregator-institution and associated with the current user.

Figure 6:
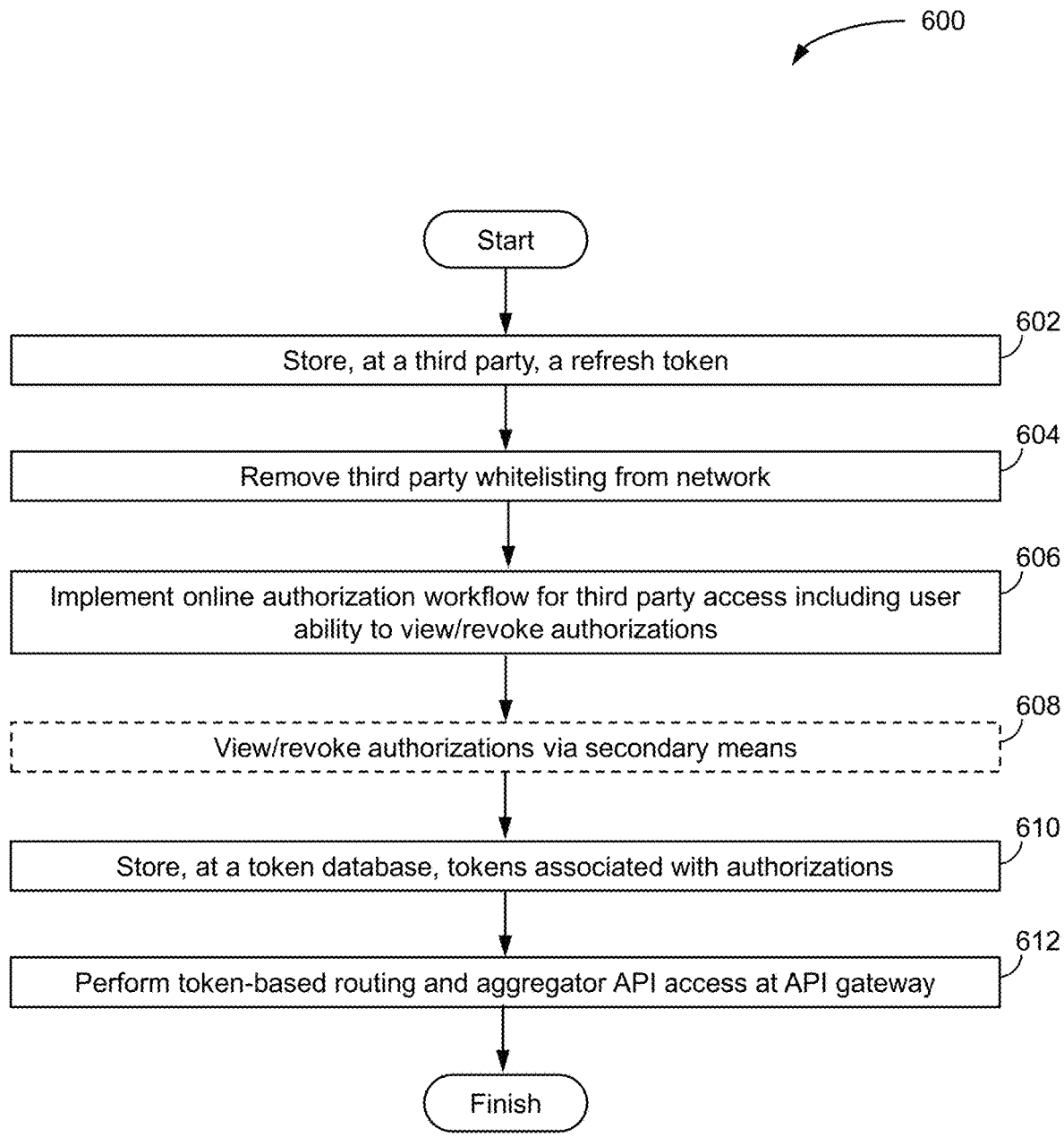
FIG. 6 illustrates another method for processing a data access request in accordance with one or more embodiments.

FIG. 6 illustrates another method 600 for processing a data access request in accordance with one or more embodiments. In an example embodiment, the method shown in FIG. 6 is performed in relation to a system for issuing a revocable 1:1:1 token, such as an open banking token, that authorizes data sharing for a specific combination of app-aggregator-institution. The system may include a client device, a server, and a token database, which interact with a third party financial tool (app).

The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include storing, at the third party, a refresh token. In an embodiment, operation 602 includes storing, at the third party, a refresh token only. Operation 602 enables no longer having a requirement for user credential storage. An operation 604 may include removing third party whitelisting from a network. Operation 606 may include implementing an online authorization workflow for third party data access including user ability to view/revoke authorizations, for example in relation to the dashboard shown in FIG. 5. An optional operation 608 may include the ability to view or revoke authorizations via a secondary means, for example associated with a customer service determination or a fraud determination. An operation 610 may include storing, at a token database, the tokens associated with the granted authorizations. An operation 612 may include performing token-based routing and aggregator API access, for example at an API gateway.

Embodiments of the present disclosure leverage open banking, which enables users or customers to share banking information out, for example with third party fintech apps. According to an embodiment, the present disclosure provides an infrastructure and uses APIs to securely tokenize, encrypt and share data out with third parties identified by customers. Embodiments of the present disclosure give data without having to share bank credentials, and replace passwords with tokens. Embodiments of the present disclosure also provide dashboard to show which tools/apps have access to data, and enable a user to revoke access at any time, rather than the typical approach of going through a data aggregator/intermediary partner. Embodiments of the present disclosure enable an institution to measure and track which apps are connected to their system, and can revoke tokens to limit data flow in case of a security incident.

From a user or customer perspective, embodiments of the present disclosure provide one or more of the following: gives banking data directly from a financial institution (FI) without revealing username & password to non-FI applications and tools; views which tools/applications have access to their data; and revokes that access at any time.

From a FI perspective, embodiments of the present disclosure provide one or more of the following: client device recognition and verification; partner data breach blast radius limited to that Partner at most; consistent edge & perimeter security mechanisms; measurable data access provides visibility on when & who accesses data; lower operational risk; customers are better protected.

From a partner or aggregator perspective, embodiments of the present disclosure provide one or more of the following: enables FI to handle authentication; purpose built for partner connected API integration & usage; edge and device security controls mitigate botnet exploitation and stolen credential usage; token storage over username/password for reliable, secure, safer and lower risk integration; better partner support & easier operability; no more cookies.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following CLAUSES, with specific features laid out in the dependent clauses:

One aspect of the present disclosure relates to a computing platform configured for processing a data access request. The computing platform may include one or more hardware processors configured by machine-readable instructions stored on a non-transient computer-readable storage medium. The processor(s) may be configured to receive, at an apparatus, a data access request from a communication device and via a network. The data access request may relate to a third party application and to a user associated with the communication device. The processor(s) may be configured to generate, at the computing platform and based on the received data access request, a revocable 1:1:1 token. The revocable 1:1:1 token may authorize data sharing for a specific combination of third party application-aggregator-institution for the user associated with the communication device.

In some implementations, the one or more processors are further configured to execute the instructions to transmit, from the computing platform, the revocable 1:1:1 token for storage in a token database.

In some implementations, the one or more processors are further configured to execute the instructions to transmit, from the computing platform, the revocable 1:1:1 token and a user identifier associated with the user, for storage in a token database to associate the revocable 1:1:1 token with a user-specific data access request.

In some implementations, the one or more processors are further configured to execute the instructions to initiate storage of the 1:1:1 token in a token database associated with the institution specified in the 1:1:1 token.

In some implementations, the one or more processors are further configured to execute the instructions to provide, in conjunction with a server in communication with the computing platform, a dashboard configured to enable a user to individually remove the third party application from data sharing based on the generated 1:1:1 token.

In some implementations, the one or more processors are further configured to execute the instructions to generate, in conjunction with a server in communication with the computing platform, the revocable 1:1:1 token independent of the aggregator.

In some implementations, the one or more processors are further configured to execute the instructions to manage, in conjunction with a server associated with the computing platform, third party application connectivity of a plurality of third party applications based on tracking associated revocable 1:1:1 tokens in a plurality of access tokens In some implementations, the access request comprises an open banking access request associated with the user. In some implementations, the third party application comprises a third party financial application. In some implementations, the institution comprises a financial institution storing data associated with the user.

Another aspect of the present disclosure relates to a method of processing a data access request. The method may include receiving, at an apparatus, a data access request from a communication device and via a network. The data access request may relate to a third party application. The method may include generating, at the apparatus and based on the received data access request, a revocable 1:1:1 token that authorizes data sharing for a specific combination of third party application-aggregator-institution.

In some implementations, the method may further include providing, at a server, a dashboard that enables a customer to individually remove the third party application from data sharing based on the generated 1:1:1 token.

In some implementations, the method may further include generating, at a server, the revocable 1:1:1 token independent of the aggregator.

In some implementations, the access request includes an open banking access request.

In some implementations, the third party application includes a third party financial application.

In some implementations, the method may further include managing, via the server, third party application connectivity of a plurality of third party applications based on tracking associated revocable 1:1:1 tokens in the plurality of access tokens.

Still another aspect of the present disclosure relates to a non-transient computer-readable storage medium having instructions embodied thereon, the instructions being executable by one or more processors to perform a computer-implemented method of processing a data access request. The method may include receiving, at an apparatus, a data access request from a communication device and via a network. The data access request may relate to a third party application. The method may include generating, at the apparatus and based on the received data access request, a revocable 1:1:1 token that authorizes data sharing for a specific combination of third party application-aggregator-institution.

In some implementations, the method may further include providing, at a server, a dashboard that enables a customer to individually remove the third party application from data sharing based on the generated 1:1:1 token.

In some implementations, the method may further include generating, at a server, the revocable 1:1:1 token independent of the aggregator.

In some implementations, the access request includes an open banking access request; and In some implementations, the third party application includes a third party financial application.

In some implementations, the method may further include managing, via the server, third party application connectivity of a plurality of third party applications based on tracking associated revocable 1:1:1 tokens in the plurality of access tokens.

Yet another aspect of the present disclosure relates to a system configured for processing a data access request. The system may include one or more hardware processors configured by machine-readable instructions. The processor(s) may be configured to receive, at an apparatus, a data access request from a communication device and via a network. The data access request may relate to a third party application. The processor(s) may be configured to generate, at the apparatus and based on the received data access request, a revocable 1:1:1 token that authorizes data sharing for a specific combination of third party application-aggregator-institution.

In some implementations, the processor(s) may be further configured to provide, at a server, a dashboard that enables a customer to individually remove the third party application from data sharing based on the generated 1:1:1 token.

In some implementations, the processor(s) may be further configured to generate, at a server, the revocable 1:1:1 token independent of the aggregator.

In some implementations, the access request includes an open banking access request.

In some implementations, the third party application includes a third party financial application.

In some implementations, the processor(s) may be further configured to manage, via the server, third party application connectivity of a plurality of third party applications based on tracking associated revocable 1:1:1 tokens in the plurality of access tokens.

Even another aspect of the present disclosure relates to a system configured for processing a data access request. The system may include means for receiving, at an apparatus, a data access request from a communication device and via a network. The data access request may relate to a third party application. The system may include means for generating, at the apparatus and based on the received data access request, a revocable 1:1:1 token that authorizes data sharing for a specific combination of third party application-aggregator-institution.

In some implementations, the system may further include means for providing, at a server, a dashboard that enables a customer to individually remove the third party application from data sharing based on the generated 1:1:1 token.

In some implementations, the system may further include means for generating, at a server, the revocable 1:1:1 token independent of the aggregator.

In some implementations, the access request includes an open banking access request.

In some implementations, the third party application includes a third party financial application.

In some implementations, the system may further include means for managing, via the server, third party application connectivity of a plurality of third party applications based on tracking associated revocable 1:1:1 tokens in the plurality of access tokens.

A further aspect of the present disclosure relates to a system configured for processing a data access request. The system may include a device interface unit, in communication with a communication device via a network. The device interface unit may be configured to receive, at an apparatus, a data access request from a communication device and via a network. The data access request may relate to a third party application and to a user associated with the communication device. The data interface unit may be configured to generate, at the apparatus and based on the received data access request, a revocable 1:1:1 token. The revocable 1:1:1 token may authorize data sharing for a specific combination of third party application-aggregator-institution for the user associated with the communication device.

Another aspect of the present disclosure relates to a system configured for processing a data access request, comprising a customer interface unit, a server, and a token database. The customer interface unit may be configured to receive a data access request from a communication device and via a network, the data access request relating to a third party application. The server may be associated with an institution and in communication with the customer interface unit and configured to generate, based on the received data access request, a revocable 1:1:1 token that authorizes data sharing for a specific combination of third party application-aggregator-institution. The token database may be configured to store a plurality of access tokens including the 1:1:1 token generated by the server.

A further aspect of the present disclosure relates to a non-transient computer-readable storage medium having instructions embodied thereon, the instructions being executable by one or more processors to perform a computer-implemented method of processing a data access request. The method may include receiving, at an apparatus, a data access request from a communication device and via a network, the data access request relating to a third party application and to a user associated with the communication device. The method may include generating, at the apparatus and based on the received data access request, a revocable 1:1:1 token that authorizes data sharing for a specific combination of third party application-aggregator-institution for the user associated with the communication device.

In some implementations, the method may further include providing, in conjunction with a server in communication with the apparatus, a dashboard configured to enable a user to individually remove the third party application from data sharing based on the generated 1:1:1 token.

In some implementations, the method may further include transmitting, from the apparatus, the revocable 1:1:1 token and a user identifier associated with the user, for storage in a token database to associate the revocable 1:1:1 token with a user-specific data access request.

In some implementations, the method may further include managing, in conjunction with a server associated with the apparatus, third party application connectivity of a plurality of third party applications based on tracking associated revocable 1:1:1 tokens in a plurality of access tokens.

A yet further aspect of the present disclosure relates to a system configured for processing a data access request, the system comprising a customer interface, a server, and a token database. The customer interface unit may be configured to receive a data access request from a communication device and via a network, the data access request relating to a third party application and to a user associated with the communication device. The server may be associated with an institution and in communication with the customer interface unit and configured to generate, based on the received data access request, a revocable 1:1:1 token that authorizes data sharing for a specific combination of third party application-aggregator-institution for the user associated with the communication device. The token database may be configured to store a plurality of access tokens including the revocable 1:1:1 token generated by the server.

In some implementations, the customer interface unit and the server may cooperate to provide a dashboard configured to enable a user to individually remove the third party application from data sharing based on the generated 1:1:1 token.

In some implementations, the customer interface unit and the server may cooperate to transmit the revocable 1:1:1 token and a user identifier associated with the user, for storage in the token database to associate the revocable 1:1:1 token with a user-specific data access request.

In some implementations, the customer interface unit and the server may cooperate to manage third party application connectivity of a plurality of third party applications based on tracking associated revocable 1:1:1 tokens in a plurality of access tokens stored in the token database.

What is claimed is:

1. A computing platform configured for processing a data access request, the computing platform comprising:
   a non-transient computer-readable storage medium having instructions embodied thereon; and
   one or more processors configured to execute the instructions to:
      receive, at the computing platform, a data access request from a communication device and via a network, the data access request relating to a third party application and to a user associated with the communication device;

generate, at the computing platform and based on the received data access request, a revocable 1:1:1 token that authorizes data sharing for a specific combination of third party application-aggregator-institution for the user associated with the communication device; and manage, in conjunction with a server associated with the computing platform, third party application connectivity of a plurality of third party applications based on tracking associated revocable 1:1:1 tokens in a plurality of access tokens, each revocable 1:1:1 token having a different access period for the specific combination of third party application-aggregator-institution.

2. The computing platform of claim 1, wherein the one or more processors are further configured to execute the instructions to:

transmit, from the computing platform, the revocable 1:1:1 token for storage in a token database.

3. The computing platform of claim 1, wherein the one or more processors are further configured to execute the instructions to:

transmit, from the computing platform of the institution, the revocable 1:1:1 token and a user identifier associated with the user, for storage in a token database to associate the revocable 1:1:1 token with a user-specific data access request.

4. The computing platform of claim 1, wherein the one or more processors are further configured to execute the instructions to:

initiate storage of the 1:1:1 token in a token database associated with the institution specified in the 1:1:1 token.

5. The computing platform of claim 1, wherein the one or more processors are further configured to execute the instructions to:

provide, in conjunction with a server of the institution in communication with the computing platform of the institution, a dashboard configured to enable a user to individually remove the third party application from data sharing based on the generated 1:1:1 token.

6. The computing platform of claim 1, wherein the one or more processors are further configured to execute the instructions to:

generate, in conjunction with a server of the institution in communication with the computing platform of the institution, the revocable 1:1:1 token independent of the third party aggregator.

7. The computing platform of claim 1, wherein:

the access request comprises an open banking access request associated with the user; the third party application comprises a third party financial application; and the institution comprises a financial institution storing data associated with the user.

8. A method of processing a data access request, the method comprising:

receiving, at an apparatus of an institution, a data access request from a communication device and via a network, the data access request relating to a third party application registered with the institution via a third party aggregator and to a user associated with the communication device;

generating, at the apparatus of the institution and based on the received data access request, a revocable 1:1:1 token that authorizes data sharing for a specific combination of the third party application, the third party aggregator, and the institution for the user associated with the communication device; and managing, in conjunction with a server of the institution associated with the apparatus of the institution, third party application connectivity of a plurality of third party applications based on tracking associated revocable 1:1:1 tokens in a plurality of access tokens, each revocable 1:1:1 token having a different access period for the specific combination of the third party application, the third party aggregator, and the institution.

9. The method of claim 8, further comprising:

transmitting, from the apparatus of the institution, the revocable 1:1:1 token for storage in a token database.

10. The method of claim 8, further comprising:

transmitting, from the apparatus of the institution, the revocable 1:1:1 token and a user identifier associated with the user, for storage in a token database to associate the revocable 1:1:1 token with a user-specific data access request.

11. The method of claim 8, further comprising:

Initiating, by the apparatus of the institution, storage of the 1:1:1 token in a token database associated with the institution specified in the 1:1:1 token.

12. The method of claim 8, further comprising: providing, in conjunction with the server of the institution in communication with the apparatus of the institution, a dashboard configured to enable a user to individually remove the third party application from data sharing based on the generated 1:1:1 token.

13. The method of claim 8, further comprising: generating, in conjunction with the server of the institution in communication with the apparatus of the institution, the revocable 1:1:1 token independent of the third party aggregator.

14. The method of claim 8, wherein:

the access request comprises an open banking access request associated with the user; the third party application comprises a third party financial application; and the institution comprises a financial institution storing data associated with the user.

15. A system configured for processing a data access request, the system being a system of an institution and comprising:

a processor configured to receive a data access request from a communication device and via a network, the data access request relating to a third party application registered with the institution via a third party aggregator and to a user associated with the communication device; and a server associated with the institution and in communication with the processor and configured to generate, based on the received data access request, a revocable 1:1:1 token that authorizes data sharing for a specific combination of the third party application, the third party aggregator, and the institution for the user associated with the communication device; and electronic storage configured to store a plurality of access tokens including the revocable 1:1:1 token generated by the server of the institution wherein the processor and the server of the institution cooperate to: manage third party application connectivity of a plurality of third party applications based on tracking associated revocable 1:1:1 tokens in a plurality of access tokens stored in the electronic storage, each revocable 1:1:1 token having a different access period for the specific combination of the third party application, the third party aggregator, and the institution.

16. The system of claim 15, wherein the processor and the server of the institution cooperate to:
provide a dashboard configured to enable a user to individually remove the third party application from data sharing based on the generated 1:1:1 token.

17. The system of claim 15, wherein the processor and the server of the institution cooperate to:
transmit the revocable 1:1:1 token and a user identifier associated with the user, for storage in the electronic storage to associate the revocable 1:1:1 token with a user-specific data access request.

* * * * *